US009632744B2

(12) United States Patent
Arrasvuori et al.

(10) Patent No.: US 9,632,744 B2
(45) Date of Patent: Apr. 25, 2017

(54) AUDIO-VISUAL INTERFACE FOR APPARATUS

(75) Inventors: Juha Henrik Arrasvuori, Tampere (FI); Kari Juhani Jarvinen, Tampere (FI); Roope Olavi Jarvinen, Lempäälä (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 353 days.

(21) Appl. No.: 14/364,229

(22) PCT Filed: Dec. 22, 2011

(86) PCT No.: PCT/IB2011/055912
§ 371 (c)(1),
(2), (4) Date: Sep. 11, 2014

(87) PCT Pub. No.: WO2013/093566
PCT Pub. Date: Jun. 27, 2013

(65) Prior Publication Data
US 2015/0033123 A1    Jan. 29, 2015

(51) Int. Cl.
*G06F 15/00* (2006.01)
*G06F 13/00* (2006.01)
(Continued)

(52) U.S. Cl.
CPC .............. *G06F 3/16* (2013.01); *G06F 3/0482* (2013.01); *G06F 3/0488* (2013.01);
(Continued)

(58) Field of Classification Search
CPC ................. G06F 3/0481; H04R 5/04
(Continued)

(56) References Cited

U.S. PATENT DOCUMENTS 6,983,251 B1 * 1/2006 Umemoto ................ H04R 5/04
                                                            704/270
7,103,841 B2 * 9/2006 Ronkainen ............ G06F 3/0481
                                                            715/727
(Continued)

FOREIGN PATENT DOCUMENTS

WO    2010116028 A2    10/2010
WO    2010118251 A2    10/2010

OTHER PUBLICATIONS

International Search Report received for corresponding Patent Cooperation Treaty Application No. PCT/IB2011/055912, dated Dec. 12, 2012, 5 pages.
(Continued)

*Primary Examiner* — Kevin Nguyen
(74) *Attorney, Agent, or Firm* — Alston & Bird LLP

(57) ABSTRACT

An apparatus comprising at least one processor and at least one memory including computer program code. The at least one memory and the computer program code is configured to, with the at least one processor, cause the apparatus at least to perform: associating at least one user interface visual display element and at least one user interface audio display element with a data representation; determining a user interface position for the data representation determining whether the user interface position for the data representation is within a visual display region; outputting the at least one visual display element when the user interface position is within the visual display region; and outputting the at least one audio display element with the user interface position wherein the outputting of at least one audio display element is generated based on the user interface position relative to the visual display region.

20 Claims, 9 Drawing Sheets

(51) Int. Cl.
*G06F 3/16* (2006.01)
*G06F 3/0488* (2013.01)
*G06F 3/0482* (2013.01)
*G06F 3/0481* (2013.01)
*G06F 3/0484* (2013.01)

(52) U.S. Cl.
CPC ...... *G06F 3/04817* (2013.01); *G06F 3/04842* (2013.01); *G06F 3/165* (2013.01)

(58) Field of Classification Search
USPC .................. 715/727, 850, 764, 803, 716
See application file for complete search history.

(56) References Cited

U.S. PATENT DOCUMENTS

2006/0048076 A1    3/2006  Vronay et al.
2011/0153044 A1    6/2011  Lindahl et al.

OTHER PUBLICATIONS

Written Opinion for International Patent Application No. PCT/IB2011/055912, mailed Dec. 12, 2012.

* cited by examiner 3D (overlapping)
double carosel 2D double carousel

AUDIO-VISUAL INTERFACE FOR APPARATUS

RELATED APPLICATION

This application was originally filed as PCT Application No. PCT/IB2011/055912 filed on Dec. 22, 2011.

FIELD

The present application relates to apparatus for processing of audio signals for assisting user interface operations. The invention further relates to, but is not limited to, apparatus for processing audio in audio playback devices.

BACKGROUND

Handhold devices apparatus have by default small displays which can present only a small amount of the information that a typical user requires. A user interface (UI) display can present information to the user in some apparatus in the form of graphical representations or 'icons' representing applications, content items, routines or operations on the device and data from such applications. These icons are presented on a desktop or homescreen on the visual display. Common user interface displays use a "visual desktop" which extend the desktop shown on the display. The visual desktop regions outside of the physical display region can be moved backwards and forwards in such a way that all of the visual desktop display regions can be shown. However, these visual desktop extensions to the desktop rely on the operator of the device to recall which applications and content items are outside of the visual desktop and where they are in relative to the displayed visual visible desktop element.

It is known that in order to assist this problem auditory icons or "earcons" can be used. Earcons are simplified tones or sound patterns used in order to be displayed as cues representing information such as applications content items or the status of such applications. Furthermore these earcons can be generated by the user of the device where they can be used to replace predefined earcons which can be used for the purpose of identifying applications and application content. In the following document the term data representation is understood to include application and application content, representations of applications or program code performing operations on the apparatus, and representations of data such as 'data files', 'content items' or 'documents'.

In some situations, a directional audio menu has been proposed where the audio icons or earcons representing applications or content items are delivered to the user through binaural headphones. A sound or earcon can be generated to represent an item like a media sound file around, on top of, or even behind the user. The various applications or content items sounds can be placed or generated simultaneously or in sequence. When a user wishes to select an item represented by a sound, the user can then point the device in the direction of the sound.

SUMMARY OF SOME EMBODIMENTS

There is provided according to a first aspect of the application a method comprising: associating at least one user interface visual display element and at least one user interface audio display element with a data representation; determining a user interface position for the data representation; determining whether the user interface position for the data representation is within a visual display region; outputting the at least one visual display element when the user interface position is within the visual display region; and outputting the at least one audio display element with the user interface position wherein the outputting of at least one audio display element is generated based on the user interface position relative to the visual display region.

The outputting of at least one audio display element is generated based on the user interface position relative to the visual display region may comprise generating at least one virtual position, wherein the at least one virtual position is at least one of: outside the visual region; and within the visual region.

Outputting the at least one visual display element when the user interface position is within the visual display region may comprise outputting the at least one visual display element in an enhanced manner when the user interface position is within the visual display region and the at least one audio display element with the user interface position is output Determining a user interface position for the data representation may comprise determining at least one of: orientation for the data representation; and distance for the data representation.

Associating at least one user interface visual display element and at least one user interface audio display element with an data representation may comprise: associating each of the at least one user interface audio display elements with a data representation state.

Outputting the at least one audio display element with the user interface position when the user interface position is outside the visual display region may comprise: determining the state of the data representation; and outputting the at least one user interface audio display element associated with the state with the user interface position.

Outputting the at least one audio display element with the user interface position when the user interface position is outside the visual display region may comprise at least one of: generating a binaural signal dependent on the at least one audio display element and the user interface position; generating a multichannel audio signal dependent on the at least one audio display element and the user interface position; and generating a filtered at least one audio display element dependent on the user interface position.

The method may further comprise: associating at least one further user interface visual display element and at least one further user interface audio display element with a further data representation; determining a further user interface position for the further data representation; determining whether the further user interface position for the further data representation is within the visual display region; outputting the at least one further visual display element when the further user interface position is within the further visual display region; and outputting the at least one further audio display element with the further user interface position wherein the outputting of at least one further audio display element is generated based on the further user interface position relative to the visual display region.

Determining a further user interface position for the further data representation may comprise determining the further user interface position relative to the user interface position.

Determining the further user interface position relative to the user interface position may comprise fixing the relative positions of the further user interface position and the user interface position.

The method may further comprise: determining a user interface input requesting a change in the user interface position for the data representation; determining a second user interface position for the data representation; determining whether the second user interface position for the data representation is within the visual display region; outputting the at least one visual display element when the second user interface position is within the visual display region; and outputting the at least one audio display element with the second user interface position wherein the outputting of at least one audio display element is generated based on the second user interface position relative to the visual display region.

The data representation may comprise at least one of: a process data representation; an application representation; a representation of program code performing operations on the apparatus; a 'data file' representation, a 'content item' representation; a 'document' representation; and a content item associated with an data representation.

The at least one user interface visual display element may comprise at least one of: an icon; a widget; and an application window.

The at least one user interface audio display element may comprise at least one of: an earcon; an auditory icon; and an audible cue.

According to a second aspect there is provided an apparatus comprising: at least one processor and at least one memory including computer code for one or more programs, the at least one memory and the computer code configured to with the at least one processor cause the apparatus to at least perform: associating at least one user interface visual display element and at least one user interface audio display element with a data representation; determining a user interface position for the data representation; determining whether the user interface position for the data representation is within a visual display region; outputting the at least one visual display element when the user interface position is within the visual display region; and outputting the at least one audio display element wherein the outputting of at least one audio display element is generated based on the user interface position relative to the visual display region.

The outputting of at least one audio display element is generated based on the user interface position relative to the visual display region may cause the apparatus to perform generating at least one virtual position, wherein the at least one virtual position is at least one of: outside the visual region; and within the visual region.

Outputting the at least one visual display element when the user interface position is within the visual display region may cause the apparatus to perform outputting the at least one visual display element in an enhanced manner when the user interface position is within the visual display region and the at least one audio display element with the user interface position is output.

Determining a user interface position for the data representation may cause the apparatus to perform determining at least one of: orientation for the data representation; and distance for the data representation.

Associating at least one user interface visual display element and at least one user interface audio display element with a data representation may cause the apparatus to perform: associating each of the at least one user interface audio display elements with an data representation state.

Outputting the at least one audio display element with the user interface position when the user interface position is outside the visual display region may cause the apparatus to perform: determining the state of the data representation; and outputting the at least one user interface audio display element associated with the state with the user interface position.

Outputting the at least one audio display element with the user interface position when the user interface position is outside the visual display region may cause the apparatus to perform at least one of: generating a binaural signal dependent on the at least one audio display element and the user interface position; generating a multichannel audio signal dependent on the at least one audio display element and the user interface position; and generating a filtered at least one audio display element dependent on the user interface position.

The apparatus may be further caused to perform: associating at least one further user interface visual display element and at least one further user interface audio display element with a further data representation; determining a further user interface position for the further data representation; determining whether the further user interface position for the further data representation is within the visual display region; outputting the at least one further visual display element when the further user interface position is within the further visual display region; and outputting the at least one further audio display element with the further user interface position wherein the outputting of at least one further audio display element is generated based on the further user interface position relative to the visual display region.

Determining a further user interface position for the further data representation may cause the apparatus to perform determining the further user interface position relative to the user interface position.

Determining the further user interface position relative to the user interface position may cause the apparatus to perform fixing the relative positions of the further user interface position and the user interface position.

The apparatus may be further caused to perform: determining a user interface input requesting a change in the user interface position for the data representation; determining a second user interface position for the data representation; determining whether the second user interface position for the data representation is within the visual display region; outputting the at least one visual display element when the second user interface position is within the visual display region; and outputting the at least one audio display element with the second user interface position wherein the outputting of at least one second audio display element is generated based on the second user interface position relative to the visual display region.

The data representation may comprise at least one of: a process data representation; an application representation; a representation of program code performing operations on the apparatus; a 'data file' representation; a 'content item' representation; a 'document' representation; and a content item associated with a data representation.

The at least one user interface visual display element may comprise at least one of: an icon; a widget; and an application window.

The at least one user interface audio display element may comprise at least one of: an earcon; an auditory icon; and an audible cue.

According to a third aspect there is provided an apparatus comprising: means for associating at least one user interface visual display element and at least one user interface audio display element with a data representation; means for determining a user interface position for the data representation; means for determining whether the user interface position for the data representation is within a visual display region; means for outputting the at least one visual display element when the user interface position is within the visual display region; and means for outputting the at least one audio display element with the user interface position wherein the outputting of at least one audio display element is generated based on the user interface position relative to the visual display region.

The means for outputting of at least one audio display element may comprise means for generating at least one virtual position, wherein the at least one virtual position is at least one of: outside the visual region; and within the visual region. Outputting the at least one visual display element when the user interface position is within the visual display region may comprise outputting the at least one visual display element in an enhanced manner when the user interface position is within the visual display region and the at least one audio display element with the user interface position is output.

The means for determining a user interface position for the data representation may comprise means for determining at least one of: orientation for the data representation; and distance for the data representation.

The means for associating at least one user interface visual display element and at least one user interface audio display element with an data representation may comprise means for associating each of the at least one user interface audio display elements with a data representation state.

The means for outputting the at least one audio display element with the user interface position when the user interface position is outside the visual display region may comprise: means for determining the state of the data representation; and means for outputting the at least one user interface audio display element associated with the state with the user interface position.

The means for outputting the at least one audio display element with the user interface position when the user interface position is outside the visual display region may comprise at least one of: means for generating a binaural signal dependent on the at least one audio display element and the user interface position; means for generating a multichannel audio signal dependent on the at least one audio display element and the user interface position; and means for generating a filtered at least one audio display element dependent on the user interface position.

The apparatus may further comprise: means for associating at least one further user interface visual display element and at least one further user interface audio display element with a further data representation; means for determining a further user interface position for the further data representation; means for determining whether the further user interface position for the further data representation is within the visual display region; means for outputting the at least one further visual display element when the further user interface position is within the further visual display region; and means for outputting the at least one further audio display element with the further user interface position wherein the outputting of at least one further audio display element is generated based on the further user interface position relative to the visual display region.

The means for determining a further user interface position for the further data representation may comprise means for determining the further user interface position relative to the user interface position.

The means for determining the further user interface position relative to the user interface position may comprise means for fixing the relative positions of the further user interface position and the user interface position.

The apparatus may further comprise: means for determining a user interface input requesting a change in the user interface position for the data representation; means for determining a second user interface position for the data representation; means for determining whether the second user interface position for the data representation is within the visual display region; means for outputting the at least one visual display element when the second user interface position is within the visual display region; and means for outputting the at least one audio display element with the second user interface position wherein the outputting of at least one audio display element is generated based on the second user interface position relative to the visual display region.

The data representation may comprise at least one of: a process data representation; an application representation; a representation of program code performing operations on the apparatus; a 'data file' representation; a 'content item' representation; a 'document' representation; and a content item associated with a data representation.

The at least one user interface visual display element may comprise at least one of: an icon; a widget; and an application window.

The at least one user interface audio display element may comprise at least one of: an earcon; an auditory icon; and an audible cue.

According to a fourth aspect there is provided an apparatus comprising: an associator configured to associate at least one user interface visual display element and at least one user interface audio display element with a data representation; a positioner configured to determine a user interface position for the data representation; a position determiner configured to determine whether the user interface position for the data representation is within a visual display region; a visual display determiner configured to output the at least one visual display element when the user interface position is within the visual display region; and an audio display determiner configured to output the at least one audio display element with the user interface position wherein the outputting of at least one audio display element is generated based on the user interface position relative to the visual display region.

The audio display determiner may be further configured to generate at least one virtual position, wherein the at least one virtual position is at least one of: outside the visual region; and within the visual region.

The visual display determiner may be configured to output the at least one visual display element in an enhanced manner when the user interface position is within the visual display region and the at least one audio display element with the user interface position is output.

The positioner may be configured to determine at least one of: orientation for the data representation; and distance for the data representation.

The associator may be configured to associate each of the at least one user interface audio display elements with a data representation state.

The audio display determiner may be configured to: determine the state of the data representation; and output the at least one user interface audio display element associated with the state with the user interface position.

The audio display determiner may comprise at least one of: a binaural audio generator configured to generate a binaural signal dependent on the at least one audio display element and the user interface position; a multichannel audio generator configured to generate a multichannel audio signal dependent on the at least one audio display element and the user interface position; and a filter configured to generate a filtered at least one audio display element dependent on the user interface position.

The associator may be configured to associate at least one further user interface visual display element and at least one further user interface audio display element with a further data representation; the positioner configured to determine a further user interface position for the further data representation; the position determiner configured to determine whether the further user interface position for the further data representation is within the visual display region; the visual display determiner configured to output the at least one further visual display element when the further user interface position is within the further visual display region; and the audio display determiner configured to output the at least one further audio display element with the further user interface position wherein the outputting of at least one further audio display element is generated based on the further user interface position relative to the visual display region.

The positioner may be configured to determine the further user interface position relative to the user interface position.

The positioner may be configured to fix the relative positions of the further user interface position and the user interface position.

The apparatus may further comprise: a user input determiner configured to determine a user interface input requesting a change in the user interface position for the data representation; the positioner configured to determine a second user interface position for the data representation based on the change in the user interface position request; the position determiner configured to determine whether the second user interface position for the data representation is within the visual display region; the visual display determiner configured to output the at least one visual display element when the second user interface position is within the visual display region; and the audio display determiner configured to output the at least one audio display element with the second user interface position wherein the outputting of at least one audio display element is generated based on the second user interface position relative to the visual display region.

The data representation may comprise at least one of: a process data representation; an application representation; a representation of program code performing operations on the apparatus; a 'data file' representation; a 'content item' representation; a 'document' representation; and a content item associated with a data representation.

The at least one user interface visual display element may comprise at least one of: an icon; a widget; and an application window.

The at least one user interface audio display element may comprise at least one of: an earcon; an auditory icon; and an audible cue.

A computer program product may be stored on a medium for causing an apparatus to perform the method as discussed herein.

An electronic device may comprise apparatus as discussed herein.

A chipset may comprise apparatus as discussed herein.

An apparatus configured to perform the method as discussed herein.

A method substantially as herein described and illustrated in the accompanying drawings.

An apparatus substantially as herein described and illustrated in the accompanying drawings.

A computer program product comprising program instructions to cause an apparatus to perform method discussed herein.

BRIEF DESCRIPTION OF DRAWINGS

For better understanding of the present application, reference will now be made by way of example to the accompanying drawings in which.

SOME EMBODIMENTS OF THE APPLICATION

Figure 1:
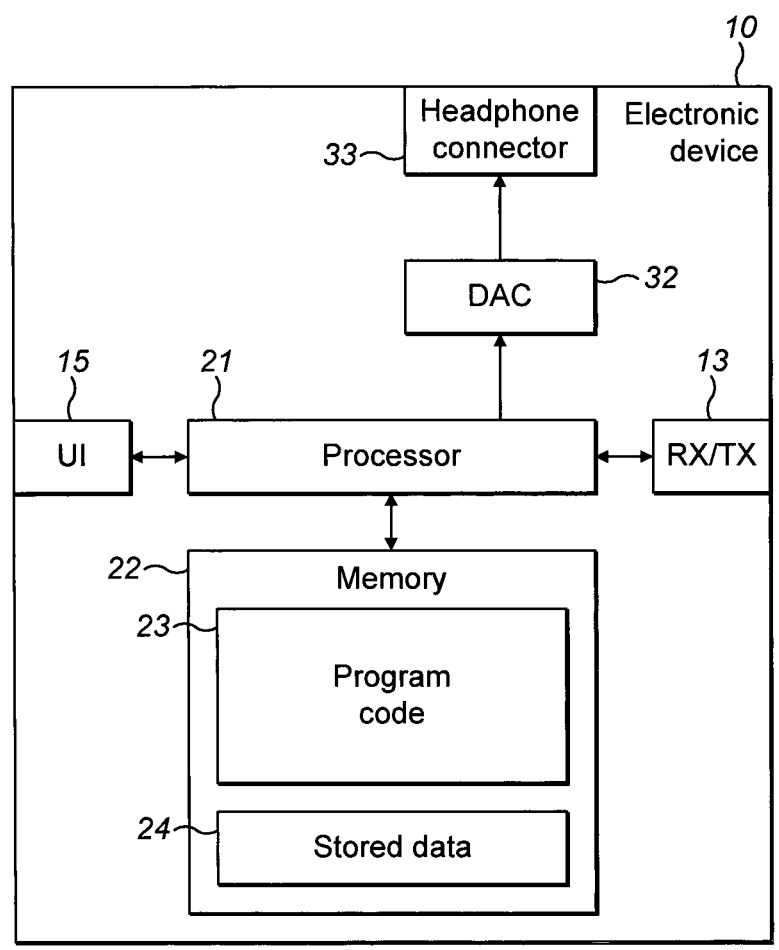
FIG. 1 shows schematically an electronic device employing embodiments of the application.

The concept of the application is a visual display which can be extended and augmented beyond the visible regions displayed by an audio display such that the sequential order and spatial distribution of icons in arrangement on the visual display is kept in the auditory display when the representations or icons are moved outside of the visual display and sounds representing them are played to the user.

It can be understood that in some embodiments, the application and content item icons when they move or slide outside the visual desktop can be represented in an auditory display to the left or right in a 2D or 3D audio field surrounding the user. Each visual icon can in such embodiments be represented by a sound 'earcon' or audible icon. The order of the display of the application or content items in the auditory display can in some embodiments remain fixed. In other words, there can be considered to be, for example, a carousel arrangement of audible icons representing applications and content items displayed to the user in the audio field. Furthermore in some embodiments, there can be a multiple layer or carousel arrangement of audible icons where the layers are arranged inside of each other. In some embodiments the depth level of such layers can be represented in a corresponding way by a 3D audio field.

It would be understood that in some embodiments, rather than a carousel arrangement of auditory icons other suitable arrangements or configurations of auditory icons can be played to the user. For example in some embodiments, the placing of auditory icons can be at not only different angles around the user but at different distances from the user. In other words, in some embodiments the user interface can be configured to organising icons on the visual display on two or more distance levels which can be reproduced correspondingly in the audio display. Thus, from a user interface viewpoint, the idea of having multiple layer or carousel organisations of icons for applications and their content icons in the visual display can be extended to the audio display is described herein.

In some embodiments, as described herein the transitions from the visual display to the auditory display can allow the user to better keep track of what items are outside the visual display. Furthermore in some embodiments when an application or content item requires the user's attention, for example an application experiences a status change when positioned in the auditory display, the carousel or arrangement of auditory icons can in some embodiments automatically rotate to the visual display at a first determined instant that does not break the current activity of the apparatus such that the attention demanding application or content item, is positioned to the front of the user. In some embodiments the attention demanding application or content item may automatically move to the front of the user taking a new position in the carousel. The new position may be temporary, i.e., when the user has acted on the attention request, the application or content item may return to its original position in the carousel.

Furthermore, in some embodiments the icon arrangement (both visual and auditory) in the form of carousels or layers can be configured such that a first (front or near) carousel can present application items while a second (rear or far) carousel can present content items associated with the application that is currently in the focus or middle of the first (or front) carousel. In other words, that the first (front) carousel displays a series of possible selection items with the centrally located item being the selected item and the second (rear) carousel displaying items related to the selected item from the first (front) carousel.

The following describes apparatus and methods for the provision of audio-visual user interface display. In this regard reference is first made to FIG. 1 where a schematic block diagram of an exemplary electronic device 10 or apparatus, which may incorporate audio-visual display components according to some embodiments of the application is shown.

The electronic apparatus 10 can for example be a mobile terminal or user equipment for a wireless communication system. In other embodiments the electronic device may be a Television (TV) receiver, portable digital versatile disc (DVD) player, a digital media player or audio player.

The apparatus 10 in some embodiments comprises in some embodiments a processor 21, an audio sub-system where for example the processor which can be linked via a digital-to-analogue converter 32 to a headphone connector for receiving a headphone or headset 33. The audio sub-system in some embodiments includes a suitable multichannel loudspeaker configuration for generating a 'surround' audio field. In some embodiments the audio sub-system can include an audio input apparatus such as microphone or array of microphones for audio capture. In some embodiments the microphones or microphone array are solid state microphones suitable for capturing audio signals and outputting digital format representations of the audio signals. In such embodiments the microphone can be implemented by any suitable microphone or audio capture means. In some embodiments the microphone can interface with the processor via a suitable analogue-to-digital converter. The processor 21 is further linked to a transceiver (TX/RX) 13, to a user interface (UI) 15 and to a memory 22.

The processor 21 may be configured to execute various program codes. The implemented program codes can in some embodiments comprise audio and/or visual display control code. The implemented program codes 23 may be stored for example in the memory 22 for retrieval by the processor 21 whenever needed. The memory 22 could further provide a section 24 for storing data, for example data that has been processed in accordance with the embodiments, such as visual or auditory item locations, associations and/or status values for use in presenting the item.

The audio and/or visual display control operations can in some embodiments be implemented at least partially in hardware or firmware.

The user interface 15 enables a user to input commands to the electronic apparatus 10, for example via a keypad, and/or to obtain information from the electronic apparatus 10, for example via a display. The apparatus in some embodiments can include a touch screen display suitable for both accepting inputs and also displaying items on a visual display component to the user. The display in the some embodiments includes an auto-stereoscopic display configured to present pseudo three dimensional images to the user without the need to wear optical filtering apparatus. The transceiver 13 in some embodiments enables a communication with other electronic apparatus, for example via a wireless communication network.

In some embodiments the apparatus includes a position or orientation sensor configured to estimate the position of the apparatus 10. The position sensor can be a satellite positioning receiver such as global positioning system (GPS) GLONASS or Galileo receiver.

In some embodiments the positioning sensor can be a cellular ID system or an assisted GPS system.

In some embodiments the apparatus 10 includes a direction or orientation sensor. The orientation/direction sensor can in some embodiments be implemented as an electronic compass, accelerometer, a gyroscope or be determined by dead reckoning from a positioning estimator.

In some embodiments the apparatus can comprise a visual imaging subsystem configured to capture visual image data. In such embodiments the visual imaging subsystem can comprise at least one camera with suitable lensing, image focus and image sensing elements.

In some embodiments the headphone connector 33 may be configured to communicate to a headphone set or earplugs wirelessly, for example by a Bluetooth profile, or using a conventional wired connection. Furthermore in some embodiments the apparatus comprises a speaker output or integrated speakers from which the audio signal is output.

It is to be understood again that the structure of the electronic apparatus 10 could be supplemented and varied in many ways.

Figure 2:
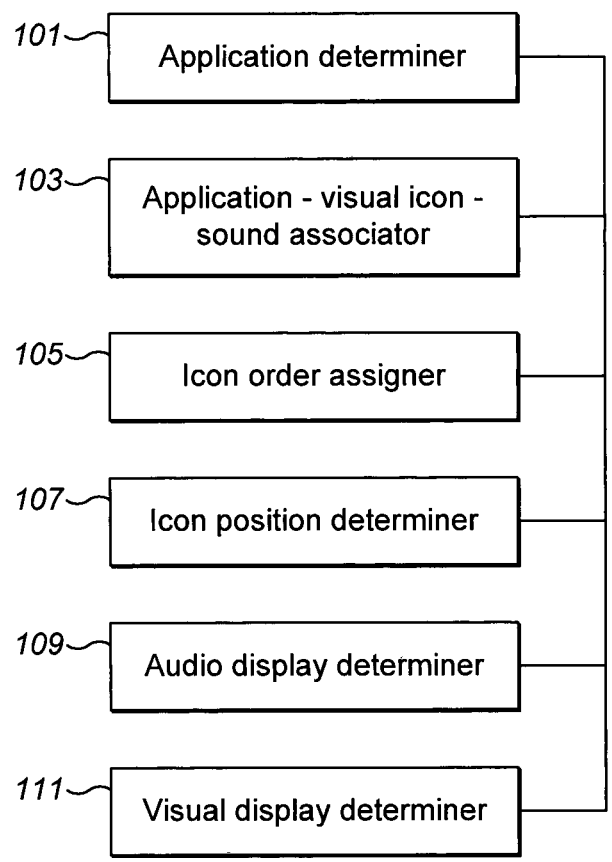
FIG. 2 shows schematically an audio-visual user interface system.

With respect to FIG. 2 an example user interface display control apparatus according to some embodiments is shown. Furthermore with respect to FIG. 3 an example operation of the user interface display control apparatus is described also.

In some embodiments the user interface display control apparatus comprises an application determiner 101 or suitable means for determining the number and status of applications. The application determiner 101 is configured to determine the number of application or content items which are currently being processed or handled by the graphical user interface. In some embodiments the application determiner 101 can further be configured to determine parameters such as a status associated with the application or content item. For example in some embodiments the application determiner 101 can determine from the application or content items in the current graphical user interface which of the applications or content items are currently active, or paused, or inactive.

Figure 3:
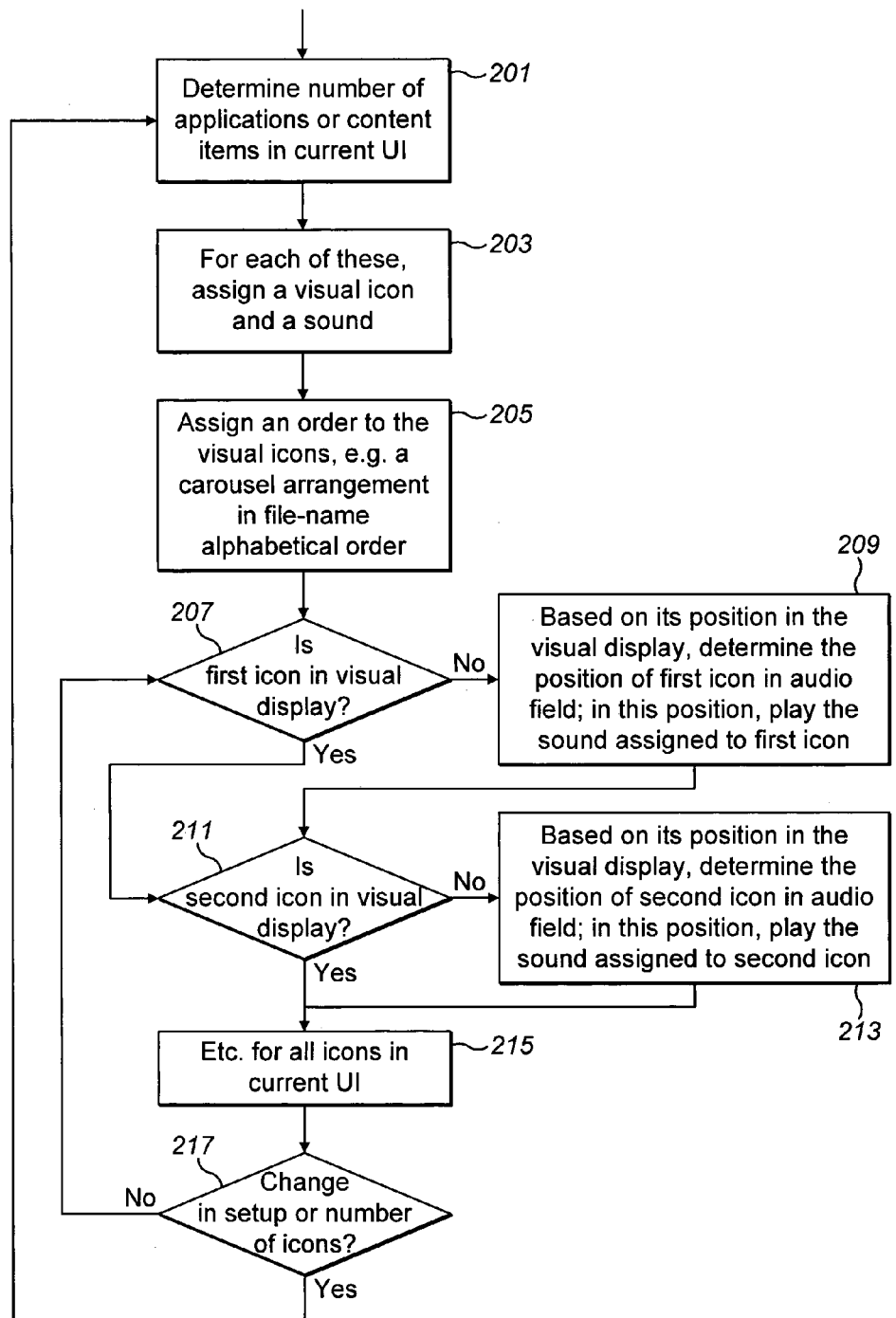
FIG. 3 shows a flow diagram of the operation of an audio-visual display system shown in FIG. 2.

The operation of determining the number of applications or content items in the current graphical user interface is shown in FIG. 3 by step 201.

The application determiner 101 could therefore in some embodiments determine the application state. For example a mail application could indicate whether there are any new messages to read—message unread, or whether any messages are held in the outbox.

In some embodiments the user interface display control apparatus comprises an application-visual icon-sound associator 103 or suitable association means. The application-visual icon-sound associator 103 can be configured to receive information with regards to each of the applications and content items currently being processed or displayed by the user interface. Furthermore the application-visual icon-sound associator can be configured to associate with each of the applications and content items at least one visual icon to be displayed when the application is located within the visible region of the display, and at least one sound or auditory icon associated with the application to be output or displayed by the audio display when the application is outside of the visible region of the display. In some embodiments the at least one auditory icon can be more than two or more auditory icons with each sound being associated with a state of the application. For example when the application item is active a first sound can be associated or chosen and when the application or content item is paused or inactive a second sound is associated or chosen.

The operation of associating at least one visual icon for the visual display and at least one sound to each of the application and content items is shown in FIG. 3 by step 203.

In some embodiments the user interface display control apparatus can further comprise an icon order assigner 105. The icon order assigner 105 can be configured to receive information with regards to each of the application and content items and assign each application and content item an order. Furthermore in some embodiments by determining an application and/or content item order the icon order assigner 105 is configured to determine which application and content items are displayed on the visible display and which are displayed in the audio display parts of the user interface output.

For example in some embodiments the icon order assigner 105 can implement a carousel arrangement and to assign an order to each of the application and content icons in a file name alphabetical order. However any suitable ordering can also be used. For example in some embodiments the ordering can be determined based on any suitable application or content item parameter such as date, file size, previous use, and status.

The operation of assigning an order to the icons associated with the applications and/or content data can be seen in FIG. 3 by step 205.

In some embodiments the user interface apparatus comprises an icon position determiner 107. The icon position determiner can be configured to carry out a series of monitoring operations with regards to whether the application and/or content item representation is within the visual display region. In some embodiments the icon position determiner 107 can be configured to select a first representation icon and determine whether or not the location of the representation 'icon' is in the visual display.

The operation of checking whether the first icon is in the visual display is shown in FIG. 3 by step 207.

Where the first icon is within the visual display the icon position determiner 107 can be configured to then check whether a second representation 'icon' is in the visual display.

The operation of checking whether the second icon is in the visual display is shown in step 211.

Where the second icon is in the visual display then a further series of loops are implemented, each loop checks for each of the remaining representations of application and/or content items or icons are within the visual display region or within the viewing angle for the apparatus.

The operation of checking for the remainder of the icons is shown in FIG. 3 by step 215.

When all of the icons have been checked the operation can then be passed to a final check to determine whether there is a change to the set up or the number of icons.

Where a change has occurred then the operation passes back to the first step of determining the number of applications. Where a change does not occur then the icon visual display determination operation 207 is carried out.

Furthermore the operation of determining whether there is a change in set up or number of icons is shown in FIG. 3 by step 217.

In some embodiments the user interface display control apparatus comprises a visual display determiner 111. The visual display determiner is configured to receive information from the icon position determiner 107 when the application and/or content item is determined to be within the visual region of the display, determine the position on the display and control the user interface to display an associated visual representation or icon on the screen or display area.

In some embodiments the user interface display control apparatus comprises an audio display determiner 109. The audio display determiner 109 is configured to receive information from the icon position determiner 107 when the application and/or content item or 'icon' is not in the visual display region. The audio display determiner 109 can then be configured to determine the 'position' of the auditory representation or icon with reference to the visual display and therefore determine the position of the auditory icon in the audio field based on the position of the icon with respect to the visual display. Furthermore in some embodiments the audio display determiner 109 can be configured to output to an audio subsystem the audio signal such that the audio sub-system outputs a sound assigned to the first icon at the determined position.

The operation of determining the position of the first icon in the audio field and playing the sound associated with the first icon at this position is shown in FIG. 3 by step 209.

Furthermore the operation of determining the position of the second icon in the audio field and playing the sound associated with the second icon is shown in FIG. 3 by step 213.

As has been described herein the apparatus or electrical device implementation audio sub-system can include a binaural audio reproduction system with headphones or two or more loudspeakers integrated on the device or separated from the device but able to supply an audio scene to the user of the device. In some embodiments implementations with external loud speakers the apparatus can also track the orientation of the user's head relative to the audio output in order to maintain a consistent directional output of application or content item audio icons with regards to the user and device orientations.

In some embodiments of the application the application-sound associator 103 can be configured to allow the system or the user to choose each sound, audible cue, or auditory icon to represent the application in the auditory display or in some embodiments the audible cue can be predefined by the system.

In some embodiments the icon position determiner can monitor a user interface input to determine when a change in set up is to be applied. For example in some embodiments the user can move the representations both in the visual and auditory display fields. In such embodiments it can be possible to move or slide a visual icon representing an application outside of the visual display for example by swiping it to the left or right side of the display.

Figure 4:
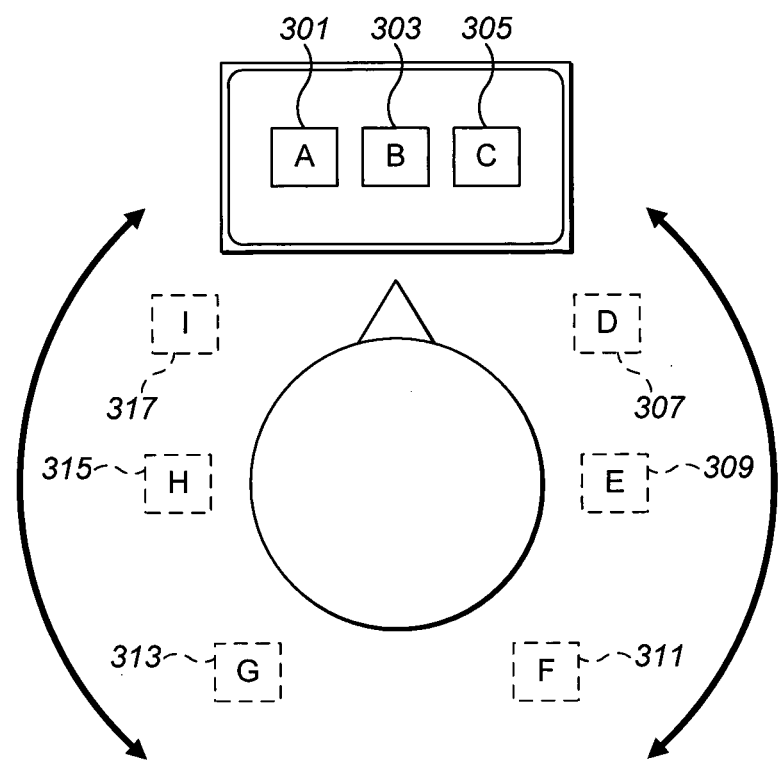
FIG. 4 shows schematically an example arrangement of visual and auditory display items according to some embodiments and example control apparatus for changing the visual and auditory display item placement.
Figure 4:
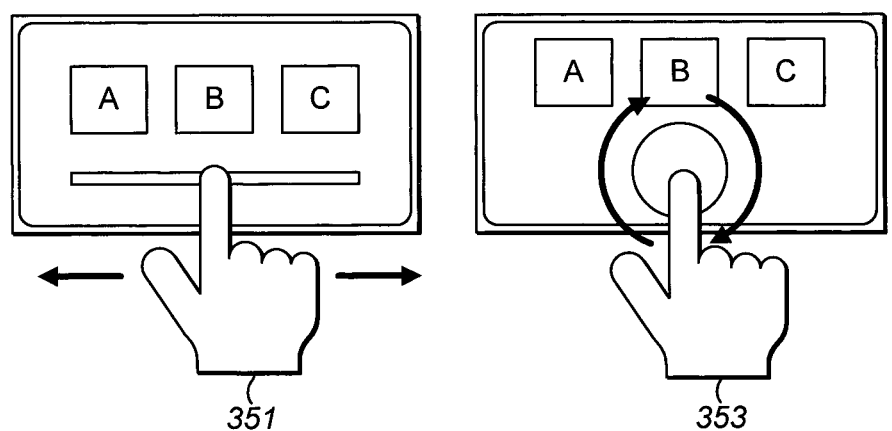

Similarly the icon position determiner can in some embodiments by monitoring user interface inputs determine an icon or application representation movement (or accessing) operation. For example where the auditory icons represent in the applications in the audio display can be moved or selected by moving or pointing the device towards the displayed sound. In some embodiments as shown in FIG. 4 the bottom part of the visual display can have a stripe or other controller for rotating an arrangement of icons such that the icons in the auditory display are brought to the visual display for accessing the applications associated with the icons. The user in some embodiments can thus rotate this arrangement of icons for example by dragging a finger or pointer controller strip on the bottom of the display for example 315 shown below FIG. 4 or by rotating a virtual disc controller 333 such as shown in the bottom right of FIG. 4.

An example audio-visual representation arrangement is shown in FIG. 4 where the apparatus comprises a display showing a visual representation of three of the icons associated with the applications. These visually displayed applications are application A with visual icon A 301, application B with visual icon B 303 and application icon C.

Furthermore FIG. 4 shows that there are further applications with associated audio icons or cues. These as shown in FIG. 4 are application D with audio icon D 307 located outside the visual display region to the right at approximately 45 degrees (clockwise with respect to the centre of the display screen), application E with audio icon E 309 located at 90 degrees, application F with audio icon F 311 located at 135 degrees, application G with audio icon G 313 located at 215 degrees, application H with audio icon H 315 located at 270 degrees, and application I with audio icon I 317 located at 315 degrees.

Furthermore although in the example shown in FIG. 4 the visual display can present only three icons at a time it would be understood that in some embodiments more than or fewer than three visual representations can be displayed within the visual region.

Furthermore although the arrangement of the audio icons as shown in FIG. 4 is a one where the icons have a regular or equal distance separation, in some embodiments the audio or visual icons are irregularly separated or irregularly spaced from each other. It would be understood that in some embodiments that the separation of audio icons can be configured to be dependent on the applications 'importance' or priority. In such embodiments 'important' audio icons are separated as much as possible from other audio icons to reduce information overload on the user.

The audio display determiner in some embodiments can be configured to arrange the audio icons spatially such that for example as shown in FIG. 4 audio icons of three applications are presented in the 3D audio field on the right hand side of the user and three applications are presented in the 3D audio field on the left side of the user. The audio display determiner 109 can in some embodiments control the audio sub-system such that the audible cues for the applications D to I can be displayed one by one in sequence. In some embodiments the audio display determiner can be configured to control the audio output to be generated once at the beginning of the initial display generation and every time the icons or representation in the visual and auditory displays change (for example when the user rotates the arrangement).

The icon arrangement or configuration as shown in FIG. 4 can be a single carousel arrangement, however any other suitable icon arrangement can be implemented.

By using any suitable UI control method the carousel or icons can be rotated and thus change the central displayed icons. In some embodiments the user interface can also use touch hover sensing or other suitable UI input. In other words the user can in some embodiments move the carousel without physically touching the display.

In some embodiments the icon position determiner 107 can be configured to move icons when an application or context item changes state or status. This motion can in some embodiments by fully automatic or require some user input. In other words in some embodiments the icon position determiner can generate a request which can be output in some embodiments as a visual icon or message, and in some embodiments as an audio icon, to indicate to the user that a decision is to be made on whether to change icon focus to the application or context item which has changed state or status.

For example using the icon arrangement shown in FIG. 4, icon B could represent photo editing code or applications and icon E represent a message or email client code or application. In some embodiments the user can be editing a photo with the photo editing application (shown by application icon B). A text message received at the apparatus by the message application represented by audio icon E can be configured to change the status of the application. Icon position determiner 207 can in some embodiments when determining a state change in the application being represented by icon E, for example if requested by a processor operating application E, be configured to locate the position of the audio icon representing application E and permit the audio display determiner 109 to control the audio output to output an audible cue. In some embodiments the audio display determiner 109 can present an auditory cue as an immediate notification or in some embodiments the auditory cue can be stored and 'displayed' as part of the next display cycle.

In this example after a while and when the user has completed editing the photo and saving the changes, the apparatus can determine that the user has completed the task and automatically rotate the carousel such that the application E with the recent message is in the front and displayed to the user. In some embodiments the user can having heard the auditory cue manually close the application B and rotate the icon arrangement to focus on the message in application E.

Figure 5:
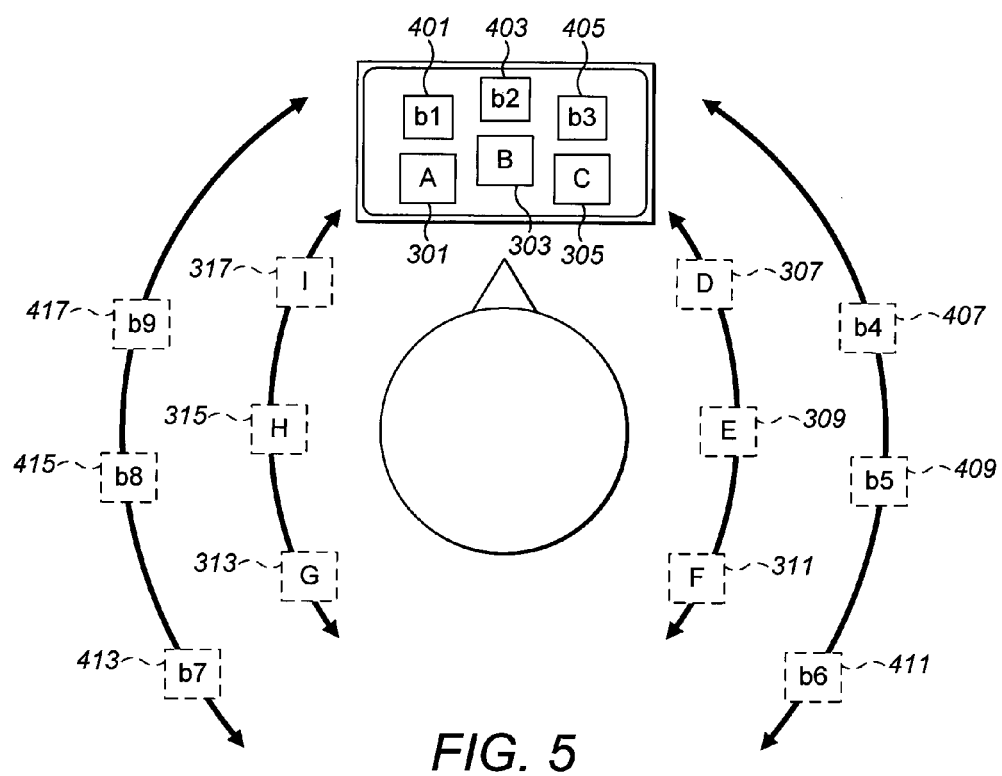
FIG. 5 shows a further example arrangement of visual and auditory display items according to some embodiments.

With regards to FIG. 5 a further example of the visual and auditory displays can be shown. In this example shown in FIG. 5 there is more than one layer or level associated with the audio-visual display. In other words there are output a visual display where the visual depth level has two carousels presented on the visible display and two levels or layers on the audio display.

For example in some embodiments the visual display can be an auto-stereoscopic display which outputs images in pseudo 3D. In some embodiments the front carousel can present application icons while the rear carousel presents content icons associated for the application that is currently the focus of (or in the middle of) the front carousel. In other words by rotating the front carousel the rear carousel moves or changes. In some embodiments the motion of the carousels is performed independent of each other. In some embodiments the carousel can be flipped such that the 'icon' at the centre and front or 'in focus' can be the content item and the rear icon is the application icon which was in focus. The user can in some embodiments choose to rotate just the rear carousel or to access different content icons. For example in some embodiments the rear carousel presents the content items used by or relevant to application B. Thus in the example shown in FIG. 5 the application B 303 shown 'in focus' on the display has content items B1 to B9 associated with application B. In such an example B1 401, B2 403 and B3 405 are displayed visually in the rear or background of the display whilst the content items B4 407, B5 409, B6 411, B7 413, B8 415, and B9 417 are displayed in the audio display in the background and behind the audio icons representing applications D to I. In such embodiments the content items B4 to B9 are Furthermore the audible cues for the content items B1 to B9 can be presented as being spatially interlaced between the audible cues for the applications D to I and furthermore be located "further away" with respect to the audio display from the user than the applications D to I.

The presenting of virtual depth levels in the audio display can be performed by any suitable method. For example in some embodiments the increasing depth level can be implemented by using decreased volume level and increased the reverberation in the sound. Thus the nearer the object to the user in the audio display the louder it becomes and the less reverberation the audible cue has.

In some embodiments distance can be implemented by filtering sounds or audible cues so that large high frequency component auditory icons can be perceived as being closer than auditory icons or sounds with muted high frequency components. Thus the audio display determiner can be configured to pass the audible cue through a low pass filter to mute the high frequency components when the audio icon is "located far away" rather than "near".

Although in the examples shown above there are two layers or levels of carousels it would be understood that in some embodiments more than two layers or levels of carousels can be implemented. It would be understood that the arrangement of the layers can define fixed or flexible orbits of icons.

In some embodiments the layers or layers are configured such that the carousel orbits are fixed and the icon arrangement within each carousel is defined. Thus in such embodiments the audio icons are substantially 'located' at defined orientations or positions about the user for example as shown in FIG. 4 there are defined auditory icon positions of position 1 at 45 degrees, position 2 at 90 degrees, position 3 at 135 degrees, position 4 at 215 degrees, position 5 at 270 degrees, and position 6 315 degrees. Any motion of the carousel causes the icons to move position—such that a single icon rotation to the left on the visible display would cause an auditory icon at position 3 to move to position 2, the auditory icon at position 4 to move to position 3 and so on.

Furthermore in some embodiments where multiple carousels are defined, the carousel or orbit distance as perceived by the user is defined and substantially fixed.

Furthermore in some embodiments the relative position between icons within the carousel is fixed when the icon is created and only changed when the icon is deleted. For example as shown in FIG. 4 if when icon D and icon E were generated that the position of icon E was the next icon to the right of icon D then as the carousel is rotated the position of icon E is fixed as always being to the right of icon D. In such embodiments by maintaining relative positioning consistency the cognitive load for the user is reduced.

In some embodiments the icon position determiner can be configured to permit a more flexible configuration of the positioning of the icons on the carousel or orbits. Therefore in some embodiments the relative positioning of icons can be flexible. In other words although the icon E is at a first time period adjacent and to the right of icon D, the icon position determiner can in some embodiments move one of the icons without moving the other.

In some embodiments the icon position determiner can furthermore be configured, where there is more than one carousel or orbit to move one of the icons from one carousel to another carousel without moving the other icons on the carousel.

In some embodiments the icon position determiner can be configured to determine positions for the icons which are not fixed in orientation positions. In some such embodiments the icons can maintain relative positioning with respect to each other but are not fixed to determined or predetermined locations.

In some embodiments the icon position determiner can be configured to determine positions for the icons which maintain relative positioning with respect to orientation but are flexible with respect to distance. For example where an icon represents an application or context item with a low priority to the user the icon position determiner can be configured dependent on an user interface input to move the icon into a distant or far carousel or orbit while maintaining an orientationally adjacent icon representing a higher priority application or context item in a close or near carousel (or orbit).

Figure 6A:
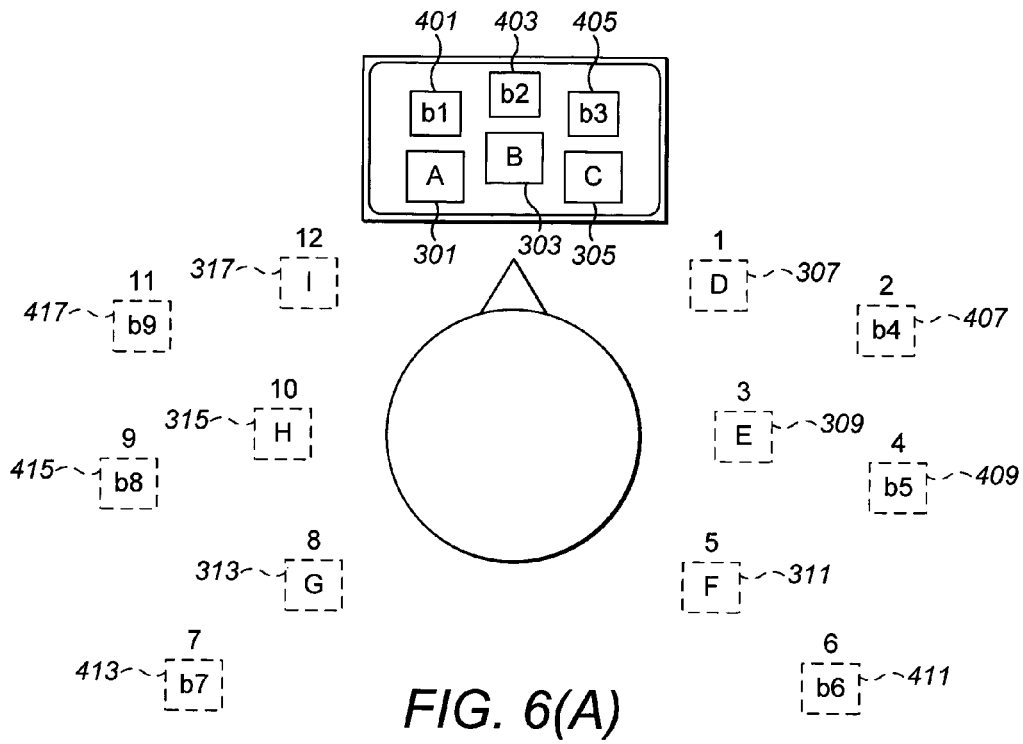
FIG. 6 shows schematically examples of auditory display ordering for auditory display items according to some embodiments.
Figure 6B:
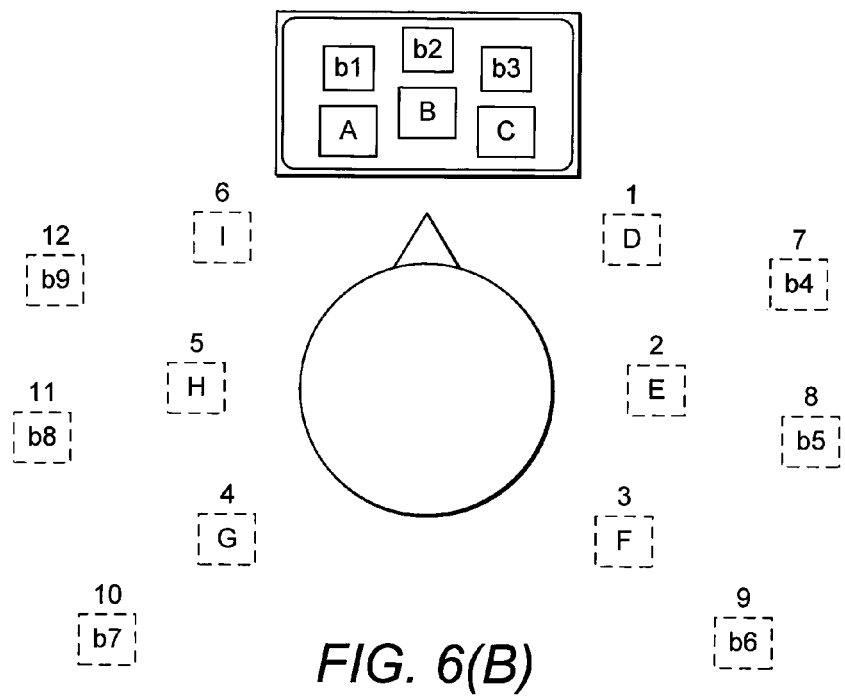

With respect to FIG. 6 two examples of implementing the order of playing auditory cues or auditory icons one by one is shown. In some embodiments a circular sequence of auditory cues can be played. For example in some embodiments every time there is a change in the icons of the carousels the auditory icon arrangement is output in order one sound at a time. In some embodiments the auditory icons are played one at a time in an increasing orientation angle order such that the first sound is the audio icon associated with application D icon D 307, the second audio icon played associated with content icon b4 icon b4 407 and then icon E 309, icon b5 409, icon F 311, icon b6 411, icon b7 413, icon G 313, icon b8 415, icon H 315, icon b9 417 and finally icon I 317 as shown in example A. In some embodiments the ordering of audio outputs is by increasing orientation angle but on (carousel) layer by layer basis. As shown in option B the order is icon D, icon E, icon F, icon G, icon H and icon I and then icon b4, icon b5, icon b6, icon b7, icon b8 and icon b9.

In some embodiments the auditory cues for icons visible in the display can be played to allow the user to better perceive which sounds represent which icons and therefore are associated with which applications.

Figure 7:
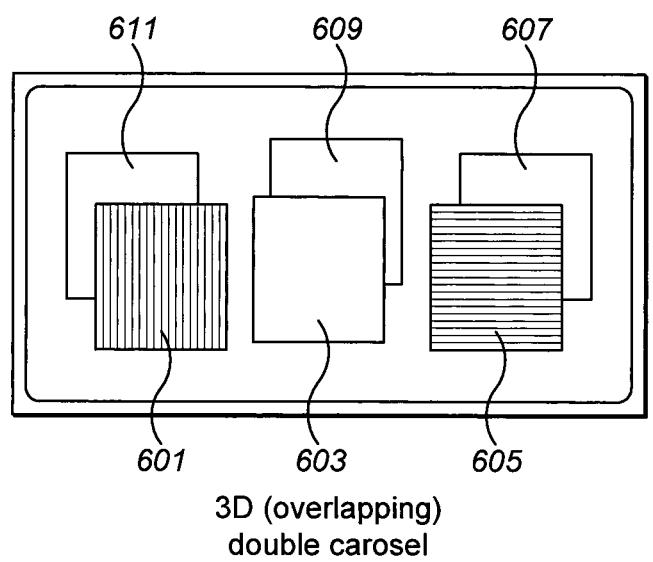
FIG. 7 shows examples of visual display arrangement of multiple layered auditory and visual items according to some embodiments.
Figure 7:
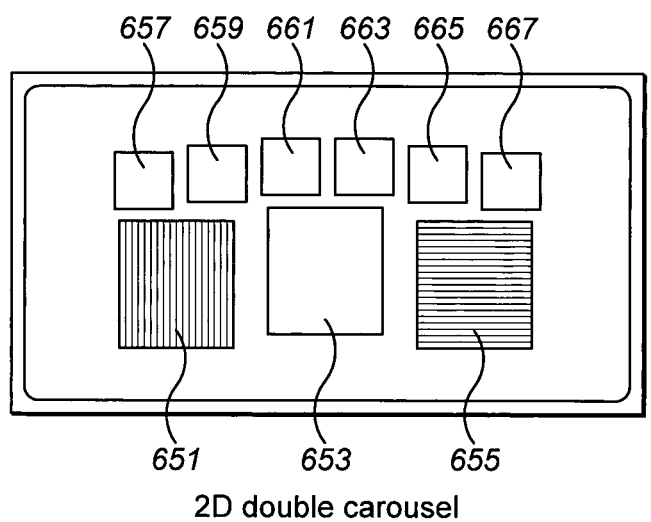

With respect to FIG. 7 an example of the visual display of the carousel items being implemented in the visual display is shown. In such an example there can be several arrangements of which the first arrangement is a pseudo 3D or overlapping double carousel approach whereby the near items of the first carousel are displayed in front of the second carousel items. In such embodiments near icons are larger than far icons. In such embodiments you have carousel items 601, 603 and 605 in the foreground of the 3D display and carousel items 611, 609 and 607 in the background of the 3D visual display. In some embodiments the 3D display can be a "virtual 3D display" and in some embodiments the 3D display can be pseudo-3D display by an auto stereoscopic or any suitable 3D display screen or panel. With respect to FIG. 7 a further 2D double carousel display example can be shown whereby the first carousel items are differentiated from the second carousel items as the first or near carousel items are displayed larger and further spaced apart than the carousel items in the second carousel. Thus as shown in FIG. 7 the 2D double carousel shows three first carousel items 651, 653 and 655 in the foreground and six rear carousel items 657, 659, 661, 663, 665 and 667. Although not illustrated, in some embodiments there may be three or more overlapping carousels of icons.

Figure 8C:
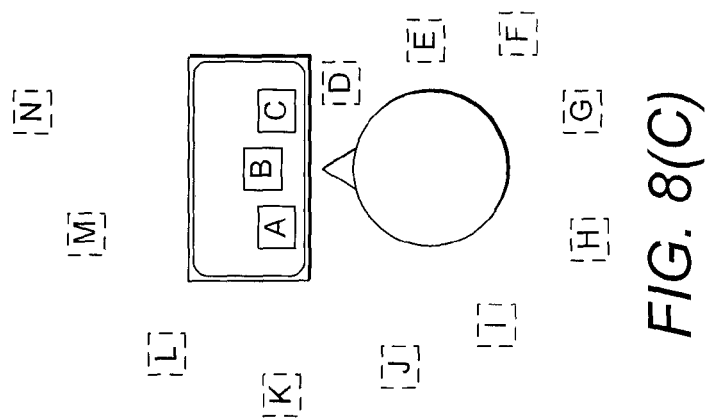
FIG. 8 shows further examples for layered auditory and visual display according to some embodiments.
Figure 8B:
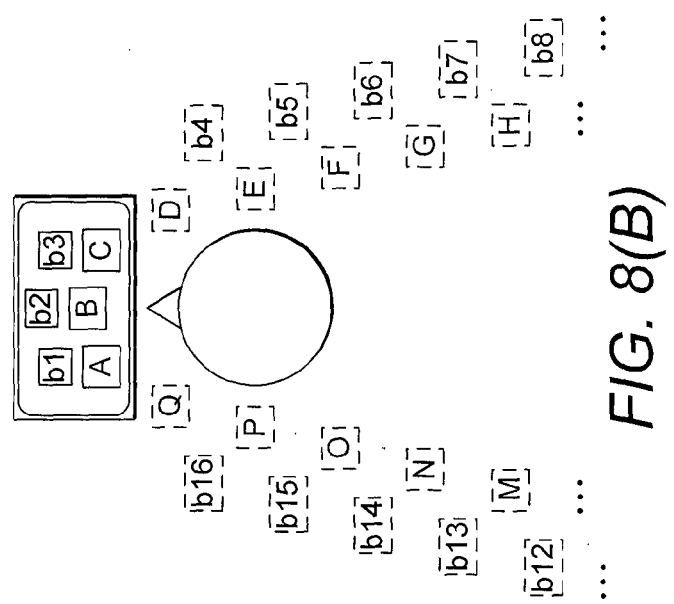
Figure 8A:
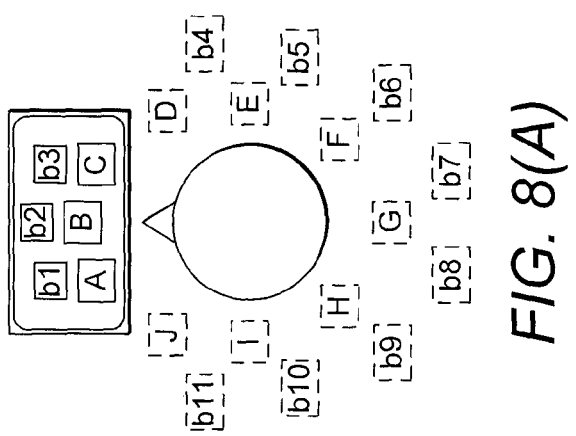

Although a circular carousel configuration of visual and audio display items can be used as shown in FIG. 8*a* any suitable arrangement can be implemented. For example as shown in FIG. 8*b* a double parabola configuration or icon organisation could be implemented. With respect to FIG. 8*c* a single layer a spiral arrangement is shown. It could be understood that the spiral arrangement can be configured in such a way that the application or content items which are in the spiral but not in the foreground of the display are displayed in a background of the visual display. In other words icon position determiner can determine in some embodiments substantially circular orbits as shown in FIG. 8*a*, and in some embodiments non-circular orbits such as shown by the parabola configuration in FIG. 8*b* and the spiral configuration in FIG. 8*c*. Other example non-circular orbits which can be determined by the icon position determiner in some embodiments are eclipse orbits, hyperbola orbits, and irregular non-conical section orbits.

In some embodiments moving the carousel or orbits of icons or icon arrangement can be quantised. In other words the representation or icon is either completely in the visual or completely outside the visual display (in the audio display). In some further embodiments moving the icons can be a continuous action such that an icon can be partially on the visual display and partially on the audio display.

Figure 9:
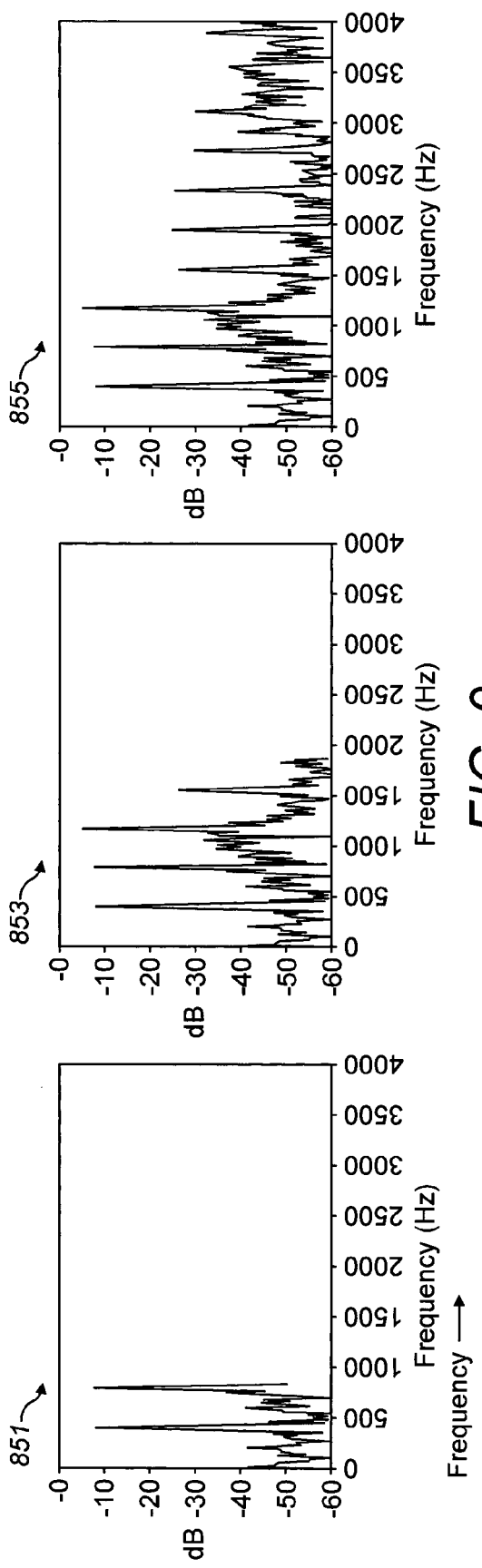
FIG. 9 shows schematically an example transition of items between an auditory display and visual display.

In some embodiments any transition of an icon from a visual display to audio display can involve a filtering of the audio icon signal. For example in some embodiments the audio display determiner can control the audio sub-system to apply a low pass filter to a sound icon when the corresponding visual icon is on the border of the visual display. In other words in some embodiments the auditory icon associated with the visual icon is heard rather than muted when the icons position begins to appear on the display. This is shown for example in FIG. 9 by the first FIG. 801 which shows the icon C moving off the visual display and the spectrum of the auditory version of icon C which is low pass filtered heavily such that the audible cue 813 high frequency components are missing. As the icon C moves further from the display edge the filtering is reduced to restore more of auditory icon 853 high frequency components and as the icon moves from the visual to the auditory display region the full sound cue 855 is restored. Thus as the icon is moved outside the visual display the audible cue becomes brighter as shown in frequency spectra diagrams 853 and 855 representing when the image moves when the visual display icon moves off the screen as shown in visual display items 803 and 805.

In such embodiments the joint handling of visual and auditory icons is improved and therefore keeps the user informed as to the location of the application. This for example can be implemented by keeping the auditory and visual icons in a synchronised carousel formation. The structure allows the user to easily move items outside the visual display, and keep track of their position as stated in the auditory display and bring them back to the visual display when needed.

Furthermore such an approach enables the more icons to be displayed by placing auditory icons not only at different positions around the user but at different distances from the user via multiple carousels. In other words in such embodiments it enables more auditory icons to be handled by having two carousels. For example a foreground application carousel and background carousel for content items.

Furthermore in such embodiments the operator of the equipment can have an improved reaction time.

Although the above examples describe embodiments of the invention operating within an electronic device 10 or apparatus, it would be appreciated that the invention as described below may be implemented as part of any audio processor. Thus, for example, embodiments of the invention may be implemented in an audio processor which may implement audio processing over fixed or wired communication paths.

Thus user equipment may comprise an audio processor such as those described in embodiments of the invention above.

It shall be appreciated that the term electronic device and user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Thus at least some embodiments may be a computer-readable medium encoded with instructions that, when executed by a computer perform: determining a loudness estimate for at least one frame of an audio signal; determining a level value for the at least one frame based on the loudness estimate; and adjusting the audio signal based on the level value.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
    associating a data representation with at least one user interface visual display element and at least one user interface audio display element;
    determining a user interface position for the data representation, wherein determining the user interface position for the data representation comprises determining at least orientation for the data representation and a distance level for the data representation;
    determining whether the user interface position for the data representation is within a visual display region;
    outputting the at least one user interface visual display element when the user interface position is within the visual display region; and
    outputting the at least one user interface audio display element with the user interface position wherein the outputting of the at least one user interface audio display element is generated based on the user interface position relative to the visual display region.

2. The method as claimed in claim 1, wherein the outputting of at least one user interface audio display element is generated based on the user interface position relative to the visual display region comprises generating at least one virtual position, wherein the at least one virtual position is one of:
    outside the visual display region; and
    within the visual display region.

3. The method as claimed in claim 1, wherein associating the data representation with the at least one user interface visual display element and the at least one user interface audio display element comprises:
    associating the at least one user interface audio display element with a data representation state.

4. The method as claimed in claim 3, wherein outputting the at least one user interface audio display element with the user interface position when the user interface position is outside the visual display region comprises:
    determining the data representation state; and
    outputting the at least one user interface audio display element associated with the data representation state with the user interface position.

5. The method as claimed in claim 1, wherein outputting the at least one user interface audio display element with the user interface position when the user interface position is outside the visual display region comprises at least one of:
    generating a binaural signal dependent on the at least one user interface audio display element and the user interface position;
    generating a multichannel audio signal dependent on the at least one user interface audio display element and the user interface position; and
    generating a filtered at least one audio display element dependent on the user interface position.

6. The method as claimed in claim 1, further comprising:
    determining a user interface input requesting a change in the user interface position for the data representation;
    determining a second user interface position for the data representation;
    determining whether the second user interface position for the data representation is within the visual display region;
    outputting the at least one user interface visual display element when the second user interface position is within the visual display region; and
    outputting the at least one user interface audio display element with the second user interface position wherein the outputting of at least one user interface audio display element is generated based on the second user interface position relative to the visual display region.

7. The method as claimed in claim 1, wherein the data representation comprises at least one of:
a process data representation;
an application representation;
a representation of program code performing operations on an apparatus;
a 'data file' representation;
a 'content item' representation;
a 'document' representation; and
a content item associated with the data representation.

8. The method as claimed in claim 1, wherein the at least one user interface visual display element comprises at least one of:
an icon;
a widget; and
an application window.

9. The method as claimed in claim 1, wherein the at least one user interface audio display element comprises at least one of:
an earcon;
an auditory icon; and
an audible cue.

10. An apparatus comprising at least one processor and at least one memory including computer code for one or more programs, the at least one memory and the computer code configured to with the at least one processor cause the apparatus to at least:
associate a data representation with at least one user interface visual display element and at least one user interface audio display element;
determine a user interface position for the data representation, wherein the determined user interface position for the data representation causes the apparatus to determine at least orientation for the data representation and a distance level for the data representation;
determine whether the user interface position for the data representation is within a visual display region;
output the at least one user interface visual display element when the user interface position is within the visual display region; and
output the at least one user interface audio display element with the user interface position wherein the outputting of the at least one user interface audio display element is generated based on the user interface position relative to the visual display region.

11. The apparatus as claimed in claim 10, wherein the output of the at least one user interface audio display element is generated based on the user interface position relative to the visual display region, further causes the apparatus to generate at least one virtual position, wherein the at least one virtual position is one of:
outside the visual display region; and
within the visual display region.

12. The apparatus as claimed in claim 10, wherein the associated data representation with the at least one user interface visual display element and the at least one user interface audio display element causes the apparatus to:
associate the at least one user interface audio display element with a data representation state.

13. The apparatus as claimed in claim 12, wherein the at least one user interface audio display element with the user interface position is outputted when the user interface position is outside the visual display region further causes the apparatus to:
determine the data representation state; and
output the at least one user interface audio display element associated with the a data representation state with the user interface position.

14. The apparatus as claimed in claim 10, wherein the at least one user interface audio display element with the user interface position is outputted when the user interface position is outside the visual display region further causes the apparatus to at least one of:
generate a binaural signal dependent on the at least one user interface audio display element and the user interface position;
generate a multichannel audio signal dependent on the at least one user interface audio display element and the user interface position; and
generate a filtered at least one audio display element dependent on the user interface position.

15. The apparatus as claimed in claim 10, further caused to:
determine a user interface input requesting a change in the user interface position for the data representation;
determine a second user interface position for the data representation;
determine whether the second user interface position for the data representation is within the visual display region;
output the at least one user interface visual display element when the second user interface position is within the visual display region; and
output the at least one user interface audio display element with the second user interface position wherein the outputting of at least one user interface audio display element is generated based on the second user interface position relative to the visual display region.

16. The apparatus as claimed in claim 10, wherein the data representation comprises at least one of:
a process data representation;
an application representation;
a representation of program code performing operations on the apparatus;
a 'data file' representation;
a 'content item' representation;
a 'document' representation; and
a content item associated with the data representation.

17. The apparatus as claimed in claim 10, wherein the at least one user interface visual display element comprises at least one of:
an icon;
a widget; and
an application window.

18. The apparatus as claimed in claim 10, wherein the at least one user interface audio display element comprises at least one of:
an earcon;
an auditory icon; and
an audible cue.

19. The method as claimed in claim 1, wherein the distance level is based on at least two depth levels on the visual display region in the form of layers, and wherein the at least two depth layers comprise a first layer displaying visual display elements and a second layer displaying elements related to the visual display elements of the first layer.

20. The method as claimed in claim 1, wherein the distance level is a distance between a user and the data representation in a multiple layer or carousel arrangement of audible display elements and visual display elements within the visual display region.

* * * * *

UNITED STATES PATENT AND TRADEMARK OFFICE
CERTIFICATE OF CORRECTION

PATENT NO. : 9,632,744 B2  
APPLICATION NO. : 14/364229  
DATED : April 25, 2017  
INVENTOR(S) : Arrasvuori et al.

Page 1 of 1

It is certified that error appears in the above-identified patent and that said Letters Patent is hereby corrected as shown below:

In the Claims

Column 22,  
Line 3, "the a" should read --the--.

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*